2,887,487

PRODUCTION OF ANHYDROUS STERILE PREPARATIONS OF ALKALI BARBITURATES AND ALKALI THIOBARBITURATES

Hans Henecka and Fritz Ziegler, Wuppertal-Elberfeld, Germany, and Wolfgang Rüggeberg, Rio de Janeiro, Brazil, assignors to Schenley Industries, Inc., New York, N.Y., a corporation of Delaware No Drawing. Application June 27, 1956
Serial No. 594,105

Claims priority, application Germany September 1, 1955

9 Claims. (Cl. 260—257)

This invention relates to new and useful improvements in the preparation of anhydrous sterile preparations of alkali barbiturates and alkali thiobarbiturates.

Alkali barbiturates and alkali thiobarbiturates are valuable narcotics, which are administered by injection intraveneously in the form of aqueous solutions. Since, however, both the barbituric and thiobarbituric acids are unstable in aqueous alkaline solutions, it is necessary to prepare and market the alkali salts of the barbituric or thiobarbituric acids for use as narcotics in solid, anhydrous form, as so-called "dry ampules," the contents of which are dissolved in water immediately before use.

In order to be marketable and satisfactory for administration, the salts contained in the dry ampules must be completely pure and anhydrous, free from any hydrolysis products, water-soluble, and highly sterile.

In practice, it is extremely difficult and cumbersome to produce the anhydrous salts in a satisfactory condition. In accordance with conventional practice, water is completely excluded during the manufacturing process, either by evaporating absolute alcohol solutions of the alkali barbiturates to dryness in vacuo, or by precipitating the salts with a precipitant, such as ligroin or the like, and then freeing the solid salt from solvent residues by prolonged after-drying. The correct amounts of the solid salt thus obtained are for each ampul to be manufactured separately weighed out, filled and sealed by fusion.

Since the alkali barbiturates and thiobarbiturates are highly hygroscopic and are even sensitive to atmospheric carbon dioxide, the conventional procedure described above does not insure that the material sealed in the ampules will be completely anhydrous, stable during storage, and water-soluble, inasmuch as the material has come in contact with the ambient atmosphere during the weighing and filling. For the same reason, it is not possible either to guarantee the sterility of the ampule material so prepared, even when the weighing and filling operations have been carried out fully automatically.

One object of this invention is the preparation of solid, anhydrous, alkali barbiturates and thiobarbiturates without the above-mentioned difficulties. This, and still further objects will become apparent from the following description:

In accordance with the invention it has been discovered that the previously encountered difficulties may be avoided and that the alkali barbiturates and alkali thiobarbiturates may be produced in anhydrous and preferably sterile form if the aqueous alkaline solutions of the barbituric or thiobarbituric acid are mixed with about 5% of a buffer salt, such as sodium carbonate of sodium phosphate at a temperature below about 10° C., and preferably between about 5° and 10° C., and the solution obtained filtered under sterile conditions and subjected to a freeze drying in the conventional manner, preferably in the ampules in which the material is to be ultimately sealed.

The starting aqueous solution should have a pH within the range of about 8 to about 12. The optimum pH is dependent upon the nature of the barbiturate or thiobarbiturate and should be such that solution occurs without hydrolysis. The aqueous alkaline solution is adjusted to the required alkalinity by addition of alkali metal hydroxide solution. Sodium or potassium hydroxide may be employed. The concentration of the barbiturate or thiobarbiturate in the starting solution should be between about 10 to about 40 percent, preferably about 20 to about 30 percent.

The addition of the buffer salt in accordance with the invention prevents hydrolysis by adjusting the pH of the aqueous alkali solution and additionally appreciably loosens and stabilizes the structure of the material resulting from the freeze drying of the concentrated solution of the alkali barbiturates and thiobarbiturates. The freeze-dried product is consequently obtained in a very readily water-soluble, finely divided, crystalline form. Suitable buffering substances are the carbonates, phosphates and citrates of alkali metals, and glycine. The buffer salts are added in an amount of about 2 to about 10 percent, preferably about 5 percent calculated on the weight of the alkali metal barbiturates.

All the measures taken for the production, filtration and filling of the solutions should be carried out at the lowest possible temperatures. The temperature should, however, exceed the freezing point and the point at which separation of solid particles starts. Preferably the temperature is about 4–10° C. For this purpose the individual ingredients must first be mixed, cooled and then combined with the others.

The filtration is carried out through Seitz-filters or other bacterial filters and at the low temperature mentioned above.

The method according to the invention is applicable to all barbiturates and thiobarbiturates, which are used by injection. Representative examples of such barbiturates are:

5-methyl-5-cyclohexenyl-N-methylbarbituric acid
5-β-bromoallyl-5-isopropyl-N-methylbarbituric acid
5-isopropyl-5-(2-bromoallyl)-barbituric acid
5-isopropyl-5-allylthiobarbituric acid
5-ethyl-5-(1-methylbutyl)-thiobarbituric acid
5-ethyl-5-(1-methylpropyl)-thiobarbituric acid
5-methylmercaptoethyl-5-ethyl-thiobarbituric acid
5-cyclohexenyl-5-allyl-thiobarbituric acid.

The method in accordance with the invention prevents the alkali barbiturates or thiobarbiturates from precipitating as gels and forming horn-like products of small internal surface during the freeze-drying, which are very difficult to de-hydrate completely, and which do not readily dissolve in water. The precipitation of the gels and the formation of the horn-like drying products of the small internal surface readily occur in the freeze-drying of salt-free solutions as contrasted to the invention.

In addition to permitting the production of pure, anhydrous, alkali barbiturates or thiobarbiturates by freeze-drying of an aqueous alkali solution, the process in accordance with the invention also makes it possible to obtain products which meet the highest requirements of sterility. This may be accomplished in actual practice by filtering the solution prepared at a temperature below 10° C. through a bacterial filter under sterile conditions in accordance with common practice, and thereafter filling the ampules with the sterile solution with the aid of an appropriate metering device and freeze-drying the solution in the ampules, and finally sealing the ampules continuously by fusing. If these steps, i.e., the filling of the ampules, the freeze-drying, and the sealing, are effected under suitable conditions, contamination of the ampule contents by bacteria or spores is largely prevented, in contrast to the conventional methods requiring manipulation of the solid material in which absolute sterility of the product cannot be assured to the extent obtained in accordance with the invention. Solutions of the alkali barbiturates and thiobarbiturates which have been prepared in accordance with the invention and which have been evenly distributed in ampules may be freeze-dried in the conventional manner.

The following examples are given by way of illustration and not limitation:

*Example 1*

In order to illustrate the dependency of the rate of hydrolysis of a barbiturate solution on its alkalinity, an aqueous alkaline solution of 5-cyclohexenyl-5-methyl-N-methyl-barbituric acid was divided into four even portions.

The first portion in the form of a 10% solution of its sodium salt having a pH of about 12 was allowed to stand at room temperature (22° C.). After standing for about seven hours it could be noted that 11.8% hydrolyzed to form the corresponding ureidocarboxylic acid through the hydrolytic rupture of the dioxopyrimidine ring. After standing for about 24 hours, about 16.4% was hydrolyzed to form the corresponding ureidocarboxylic acid.

The second portion is formed in the same manner as the first, except with a 10% excess of the alkali and allowed to stand at the same temperature. After about one hour 26.3% of the barbituric acid was hydrolyzed, after about 3 hours 56.8% was hydrolyzed, and after about 9 hours 98.5% was hydrolyzed.

The third portion in the form of a 20% solution of the sodium salt was buffered with 5% of sodium phosphate in the form of "Soerensen phosphate" ($Na_2HPO_4 \cdot 2H_2O$), adjusted to a pH of 11.3. After 7 hours of standing, only 4.5% had hydrolyzed, and after 24 hours, only 10.5% had hydrolyzed.

The fourth portion was treated in the same manner as the third portion, except that the solution was prepared at 10° C. and allowed to stand at the same temperature. After 15 hours, only 2.5% had hydrolyzed; after 24 hours only 2.7% had hydrolyzed; and after 41 hours only 3.2% had hydrolyzed. Similar results were obtained with the more acidic and hence the more stable 5,5-disubstituted thiobarbituric acids. The ordinarily low rates of hydrolysis of these acids were further reduced by the addition of 5% sodium carbonate to such a degree that practically no hydrolysis could be detected in such solutions after standing for 24 hours. In preparing solutions of 5,5-disubstituted thiobarbituric acids, suitable for freezing-drying it was found preferable first to dissolve the thiobarbituric acid in about 105% of the computed amount of aqueous alkali at 10° C. to form an approximately 20% solution for the purpose of increasing the dissolving rate and to thereafter adjust the alkali excess to the optimum pH which has been experimentally determined by addition of the calculated quantity of sodium bicarbonate.

*Example 2*

A solution of 10 g. of "Soerensen" sodium phosphate ($Na_2HPO_4 \cdot 2H_2O$) in 400 cc. of water is mixed with 180 cc. of decinormal caustic soda solution and cooled to 10° C. Subsequently, 200 g. of sodium 5-cyclohexenyl-5-methyl-N-methyl-barbiturate is introduced into this solution while continuously cooling. When this has dissolved, the solution is made up to 1000 cc. with distilled water and filtered through a bacterial filter. Ampules of 15-20 cc. capacity are then each filled with 5 cc. of this solution. After freezing in a freezing bath, the ampules are first dried in the freeze-drying cabinet at room temperature under a pressure of $3 \times 10^{-2}$ to $1 \times 10^{-2}$ mm. of mercury for 6 hours, and during the following 12 hours, the temperature is gradually raised to 38-40° C., and then drying is continued at 40° C. for another 4 hours. The ampules thus obtained, each of which contains 1 gram of sodium barbiturate, are sealed by fusion shortly after termination of the drying process.

*Example 3*

Three hundred and sixty grams of 5-allyl-5-prim-isobutyl-thiobarbituric acid are gradually introduced with stirring into 1040 cc. of 1.5 N-caustic soda solution at 10° C. After its dissolution a solution of 18.66 grams of sodium bicarbonate in a mixture of 80 cc. of 1.5 N-caustic soda solution and 400 cc. of water is added. The volume of the resulting solution is finally made up to 1965 cc. The pH of this solution is 10.2-10.3. Five cc. of the solution contains 1 gram of the sodium salt of the above thiobarbituric acid.

After filtration of the solution through a bacterial filter, quantities of 5 cc. are filled into ampules of 15-20 cc. capacity, and freeze-drying is performed as described in Example 1.

While the invention has been described in detail with reference to the specific embodiments, various changes and modifications will become apparent to the skilled artisan which fall within the spirit of the invention and the scope of the appended claims.

We claim:

1. Process for the production of anhydrous sterile preparations of a member selected from the group consisting of alkali barbiturates and alkali thiobarbiturates, which comprises admixing 5% of a buffer salt with an aqueous solution of a member selected from the group consisting of barbituric and thiobarbituric acid, filtering the solution obtained under sterile conditions and freeze-drying the filtered solution.

2. Process according to claim 1, in which said admixing of the buffer salt and said filtering under sterile conditions are effected at a temperature below about 10° C., and in which the solution is maintained at said temperature up to said freeze-drying.

3. Process according to claim 2, in which said admixing and said filtering are effected at a temperature of between about 5 and 10° C., and in which the solution is maintained at said temperature up to said freeze-drying.

4. Process according to claim 1, in which said buffer salt is sodium carbonate.

5. Process according to claim 1, in which said buffer salt is sodium phosphate.

6. Process according to claim 1, in which said aqueous alkaline solution is a 20% solution of a member selected from the group consisting of alkali barbiturates and alkali thiobarbiturates.

7. Process according to claim 1, in which the filtered solution is placed in ampules and subjected to said freeze-drying in the ampules, and which includes hermetically sealing the ampules after said freeze-drying.

8. Process according to claim 7, in which said admixing and filtering are effected at a temperature below about 10° C., and in which solution is maintained at said temperature up to said freeze-drying.

9. Process according to claim 8, in which the admixing and filtering is effected at a temperature between about 5 and 10° C., and in which the solution is maintained at said temperature up to said freeze-drying.

References Cited in the file of this patent

UNITED STATES PATENTS

| | | |
|---|---|---|
| 1,488,844 | Straub | Apr. 1, 1924 |
| 2,067,317 | Gruber | Jan. 12, 1937 |

OTHER REFERENCES

Swift: Jour. of Bacteriology, pp. 411-421 (1937).
Craigie: British Jour. of Exp. Pathology, vol. 12, pp. 75-77 (1931).